US012420397B2

(12) United States Patent
Werner

(10) Patent No.: US 12,420,397 B2
(45) Date of Patent: Sep. 23, 2025

(54) STRIKING MECHANISM DEVICE FOR A HAND-HELD POWER TOOL

(71) Applicant: Robert Bosch GmbH, Stuttgart (DE)

(72) Inventor: Immanuel Werner, Bad Urach (DE)

(73) Assignee: Robert Bosch GmbH, Stuttgart (DE)

( * ) Notice: Subject to any disclaimer, the term of this patent is extended or adjusted under 35 U.S.C. 154(b) by 18 days.

(21) Appl. No.: 18/004,852

(22) PCT Filed: Jun. 21, 2021

(86) PCT No.: PCT/EP2021/066732

§ 371 (c)(1),
(2) Date: Jan. 9, 2023

(87) PCT Pub. No.: WO2022/012862

PCT Pub. Date: Jan. 20, 2022

(65) Prior Publication Data

US 2023/0264334 A1 Aug. 24, 2023

(30) Foreign Application Priority Data

Jul. 14, 2020 (DE) ..................... 10 2020 208 757.1

(51) Int. Cl.
*B21D 5/00* (2006.01)
*B25D 17/06* (2006.01)

(52) U.S. Cl.
CPC ............... *B25D 17/06* (2013.01); *B21D 5/00* (2013.01); *B25D 2217/0019* (2013.01)

(58) Field of Classification Search
CPC ............ B25D 17/06; B25D 2217/0019; B25D 2250/231; B25D 2250/235
USPC .................................................. 173/126, 133
See application file for complete search history.

(56) References Cited

U.S. PATENT DOCUMENTS

| | | | | |
|---|---|---|---|---|
| 6,116,352 | A * | 9/2000 | Frauhammer | B25D 11/005 173/48 |
| 9,527,199 | B2 * | 12/2016 | Massler | B25D 11/06 |
| 9,969,072 | B2 * | 5/2018 | Fuenfer | B21C 37/30 |
| 2012/0234571 | A1 | 9/2012 | Kamegai et al. | |
| 2020/0198111 | A1 | 6/2020 | Tynkkynen et al. | |

FOREIGN PATENT DOCUMENTS

| | | | |
|---|---|---|---|
| DE | 33 07 482 | A1 | 10/1983 |
| DE | 44 00 454 | A1 | 7/1995 |
| DE | 103 33 799 | B3 | 2/2005 |
| DE | 10 2004 060 852 | A1 | 7/2005 |
| DE | 10 2011 007 660 | A1 | 10/2012 |
| DE | 10 2014 212 161 | A1 | 12/2015 |
| GB | 190418743 | A | 6/1905 |

OTHER PUBLICATIONS

International Search Report corresponding to PCT Application No. PCT/EP2021/066732, mailed Nov. 12, 2021 (German and English language document) (6 pages).

* cited by examiner

*Primary Examiner* — Thanh K Truong
*Assistant Examiner* — Patrick B Fry
(74) *Attorney, Agent, or Firm* — Maginot, Moore & Beck LLP

(57) ABSTRACT

A striking mechanism device for a hand-held power tool has at least one hammer tube, in particular made of sheet metal. The hammer tube is provided to guide a hammer and/or a drive piston. The hammer tube is seam-freely longitudinally slit over at least substantially the entire longitudinal extent of the hammer tube.

12 Claims, 5 Drawing Sheets

STRIKING MECHANISM DEVICE FOR A HAND-HELD POWER TOOL

This application is a 35 U.S.C. § 371 National Stage Application of PCT/EP2021/066732, filed on Jun. 21, 2021 which claims the benefit of priority to Serial No. DE 10 2020 208 757.1, filed on Jul. 14, 2020 in Germany, the disclosures of which are incorporated herein by reference in their entirety.

BACKGROUND

DE 10 2011 007 660 A1 discloses a striking mechanism device for a hand-held power tool, having at least one hammer tube, the hammer tube being provided for guiding a striker and/or a drive piston.

SUMMARY

The disclosure relates to a striking mechanism device for a hand-held power tool, having at least one hammer tube, in particular made of sheet metal, wherein the hammer tube is provided for guiding a striker and/or a drive piston.

It is proposed that the hammer tube is designed to be seamlessly longitudinally slotted over at least substantially the entire longitudinal extension of the hammer tube. The striking mechanism device is preferably designed as a pneumatic striking mechanism, in particular as a wobble striking mechanism or as an eccentric striking mechanism. The pneumatic striking mechanism device preferably comprises the striker and/or the drive piston, which is configured to drive the striker. A compression chamber of the striking mechanism device is preferably arranged between the striker and the drive piston, in which compression chamber an air cushion can be compressed during operation of the striking mechanism device designed as a pneumatic striking mechanism. The drive piston can be driven, for example, via a wobble drive of the striking mechanism device designed as a wobble striking mechanism, or via an eccentric drive of the striking mechanism device designed as an eccentric striking mechanism. The drive piston and the striker preferably have substantially the same maximum outside diameter. The hammer tube preferably has a circular cross section, in particular over the entire longitudinal extension of the hammer tube. The longitudinal extension of the hammer tube, in particular the entire longitudinal extension of the hammer tube, preferably runs in parallel with a main axis of extension of the hammer tube. A "main axis of extension" of an object is to be understood in particular as an axis which runs in parallel with a longest edge of a smallest geometric cuboid which substantially completely encloses the object. The fact that the hammer tube is designed to be "seamlessly longitudinally slotted" should be understood in particular to mean that the hammer tube, preferably a peripheral surface of the hammer tube, has at least one longitudinal slot which is preferably at least free of a glued seam, a welded seam, or the like. The hammer tube preferably has exactly one longitudinal slot. Furthermore, it is also conceivable that the hammer tube has a plurality of longitudinal slots. The longitudinal slot is preferably formed in the peripheral surface of the hammer tube. The longitudinal slot runs in particular in parallel with the main axis of extension of the hammer tube. However, it is also conceivable that the longitudinal slot runs transversely, in particular at an angle of particularly less than 90°, preferably less than 45°, and very particularly preferably less than 15°, to the main axis of extension of the hammer tube. The hammer tube is preferably designed to be rotationally symmetrical with respect to the main axis of extension of the hammer tube. In particular, the hammer tube, in particular the peripheral surface thereof, has two free longitudinal edges that delimit the longitudinal slot. The two free longitudinal edges are preferably situated opposite each other, in particular at least when viewed along a circumferential direction of the hammer tube running at least in a plane extending perpendicularly to the main axis of extension. The two free longitudinal edges are preferably designed without teeth and/or have a straight profile along a portion that corresponds to at least 25% of a maximum longitudinal extension of the hammer tube. The two free longitudinal edges preferably run in parallel with the main axis of extension of the hammer tube. However, it is also conceivable that the two free longitudinal edges run transversely, in particular at an angle of particularly less than 90°, preferably less than 45° and very particularly preferably less than 15°, to the main axis of extension of the hammer tube. The longitudinal slot is in particular free of a weld seam, an adhesive seam, or the like, preferably over the entire longitudinal extension of the hammer tube. A region between the two free longitudinal edges, in particular at least as viewed along the circumferential direction of the hammer tube, is preferably free of an adhesive seam, a welded seam, or the like, preferably over the entire longitudinal extension of the hammer tube.

The striking mechanism device preferably comprises at least one hammer tube guide element in which the hammer tube can preferably be arranged. The hammer tube is preferably arranged in the hammer tube guide element at least in one operating state. The hammer tube guide element is preferably of tubular design. The hammer tube guide element preferably has at least one circular internal cross section. A plurality of bearing ribs, on which in particular the hammer tube rests in at least one operating state, is preferably formed on an inner side of the hammer tube guide element. Each of the main axes of extension of the bearing ribs preferably runs in parallel with a main axis of extension of the hammer tube guide element. The bearing ribs preferably extend over an entire longitudinal extension of the hammer tube guide element. The longitudinal extension, in particular the entire longitudinal extension, of the hammer tube guide element preferably runs in parallel with the main axis of extension of the hammer tube guide element. The bearing ribs are preferably distributed along a circumferential direction of the hammer tube guide element which runs in a plane perpendicular to the main axis of extension of the hammer tube guide element. In particular, the bearing ribs are designed to be interrupted in some places, in particular at least as viewed along the respective main axes of extension of the bearing ribs. However, it is also conceivable that the bearing ribs, at least as viewed along the respective main axes of extension of the bearing ribs, are designed without interruption. A maximum longitudinal extension of the hammer tube guide element preferably corresponds to the maximum longitudinal extension of the hammer tube. At least in one operating state, the hammer tube is preferably at least substantially completely surrounded by the hammer tube guide element, in particular at least as viewed radially. "At least substantially completely" should be understood to mean in particular at least 50%, preferably at least 75%, and particularly preferably at least 90% of a total volume and/or a total mass of an object, in particular the hammer tube. The hammer tube guide element can be formed, for example, at least partially, preferably completely, from a light metal, in particular aluminum or the like, or from a plastics material. The hammer tube guide element can preferably be nonpositively fastened to a gear housing of the striking mechanism device and/or the hand-held power tool. It is also conceivable that the hammer tube guide element is designed as a single piece together with the gear housing of the striking mechanism device and/or the hand-held power tool. “As a single piece” is to be understood in particular to mean at least connected by a material bond, for example by a welding process, an adhesive process, an injection molding process, and/or another process that appears sensible to a person skilled in the art, and/or advantageously formed as a single piece, such as by manufacture from a single casting and/or by manufacture in a one-component or multi-component injection molding process, and advantageously from a single blank.

The design according to the disclosure advantageously makes it possible to produce a hammer tube in a particularly simple manner. A striking mechanism device can advantageously be provided with a particularly light hammer tube. Production costs can advantageously be saved. A striking mechanism device with a particularly precisely fitting hammer tube can advantageously be provided, while at the same time being cost-effective to manufacture. A particularly comfortable and precisely fitting assembly of a hammer tube on a hammer tube guide element can advantageously be made possible.

It is also proposed that the hammer tube has two free longitudinal edges, in particular the free longitudinal edges already mentioned above, which, in particular at least in one operating state, adjoin and contact each other without a material bond. The two free longitudinal edges preferably adjoin and contact each other without a material bond over the entire longitudinal extension of the hammer tube. In particular, the two free longitudinal edges, viewed along the circumferential direction of the hammer tube, adjoin each other, in particular in such a way that the end faces of the longitudinal edges touch, or the longitudinal edges overlap and, viewed along a perpendicular to the main axis of extension of the hammer tube, adjoin each other. The two free longitudinal edges are preferably at least in contact with each other when the hammer tube is arranged in the hammer tube guide element. A maximum outside diameter of the hammer tube preferably corresponds, in particular in at least one embodiment, to a maximum inside diameter of the hammer tube guide element. The maximum inside diameter of the hammer tube guide element is particularly preferably smaller than the maximum outside diameter of the hammer tube. The dimensions of the hammer tube and/or the hammer tube guide element, in particular the maximum inside diameter of the hammer tube guide element and/or the maximum outside diameter of the hammer tube, are preferably selected in such a way that the arrangement of the hammer tube in the hammer tube guide element prevents out-of-roundness in the hammer tube, and a distance between the two free longitudinal edges or the like can be corrected. The maximum inside diameter of the hammer tube guide element is specified in particular by the bearing ribs of the hammer tube guide element. It is conceivable that by inserting the hammer tube into the hammer tube guide element, a movement of the two free longitudinal edges toward each other can be produced, in particular until the two free longitudinal edges contact each other. A cost-effective and lightweight hammer tube can advantageously be provided, which can be arranged with a particularly precise fit on a hammer tube guide element. A certain sealing of the longitudinally slotted hammer tube can advantageously be achieved.

Furthermore, it is proposed, in particular additionally or alternatively, that the hammer tube has two free longitudinal edges, in particular the free longitudinal edges already mentioned above, with a cavity or a spacing being formed between the longitudinal edges. A gap is preferably formed between the two free longitudinal edges. In particular, the two free longitudinal edges are spaced apart from each other, viewed along the circumferential direction of the hammer tube, in particular in such a way that end faces of the two free longitudinal edges are not in contact. The cavity or the spacing can preferably be formed between the two free longitudinal edges, at least when the hammer tube is not arranged in the hammer tube guide element. However, it is also conceivable that a cavity or a spacing is formed between the two free longitudinal edges when the hammer tube is arranged in the hammer tube guide element, in particular depending on a permissible tolerance range for a minimum inside diameter of the hammer tube for guiding the striker. The cavity or the spacing preferably extends along the entire longitudinal extension of the hammer tube. The two free longitudinal edges, viewed in the circumferential direction, preferably have a maximum spacing of in particular less than 1 mm, preferably less than 0.5 mm, particularly preferably less than 0.1 mm, and very particularly preferably less than 0.01 mm. The cavity or the spacing is in particular at least free of a weld seam, an adhesive seam, or the like. A high fit precision of the hammer tube can advantageously be ensured in a particularly simple manner; at the same time, the hammer tube can be produced cost-effectively.

It is also proposed that the striking mechanism device has at least one cover element which, in particular at least in one operating state, contacts an outer surface of the hammer tube and overlaps a longitudinal slot in the hammer tube—in particular, the previously mentioned longitudinal slot of the hammer tube—in such a way that a gap seal can be produced between the longitudinal slot and the cover element. The cover element preferably overlaps the longitudinal slot at least as viewed along the circumferential direction of the hammer tube. The cover element preferably overlaps the longitudinal slot over an entire longitudinal extension of the longitudinal slot. The cover element has in particular at least one main axis of extension, which preferably runs in parallel with the main axis of extension of the hammer tube and/or to the main axis of extension of the hammer tube guide element at least in one operating state. The cover element preferably overlaps the longitudinal slot when the hammer tube is arranged in the hammer tube guide element, in particular in an operating position. However, it is also conceivable, particularly in at least one embodiment, for the cover element to overlap the longitudinal slot when the hammer tube is arranged in the hammer tube guide element and when the hammer tube is separated from the hammer tube guide element. The cover element is preferably arranged between two bearing ribs of the bearing ribs, preferably at least as viewed along the circumferential direction of the hammer tube guide element, in particular at least when the hammer tube is arranged in the hammer tube guide element. The cover element is preferably provided to seal the longitudinal slot in a fluid-tight manner, in particular in an air-tight manner. The region, in particular the cavity or the spacing, between the two free longitudinal edges is preferably at least substantially, preferably completely, free of the cover element. The cover element is preferably designed differently from the hammer tube. Alternatively, however, it is conceivable for the cover element to be formed by the hammer tube, wherein at least one free longitudinal edge of the two free longitudinal edges of the hammer tube is folded back in such a way, in particular in a Z or S shape, in particular at least when viewed along the circumferential direction of the hammer tube, that a gap seal can be produced. Advantageously, it is then possible to seal a cost-effectively produced, seamlessly longitudinally slotted hammer tube. Advantageously, fluid-tightness of a hammer tube can be ensured, with a particularly high fit precision of the hammer tube at the same time.

It is further proposed that the striking mechanism device, in particular in at least one embodiment, has at least one cover element—in particular, the previously mentioned cover element—which, in particular at least in one operating state, contacts an outer surface of the hammer tube—in particular, the previously mentioned outer surface—and in particular has the aforementioned hammer tube guide element in which the hammer tube can be arranged, wherein, along a circumferential direction—in particular, the previously mentioned circumferential direction—of the hammer tube guide element, at least one recess is formed on an inner side—in particular, the previously mentioned inner side—of the hammer tube guide element, in which recess the cover element is arranged. The recess is preferably delimited by at least two bearing ribs of the bearing ribs, in particular bearing ribs which are directly adjacent along the circumferential direction of the hammer tube guide element. In at least one embodiment, in particular at least in one operating state, the cover element is preferably surrounded by the hammer tube guide element, in particular at least as viewed along a circumferential direction of the cover element that runs in a plane perpendicular to the main axis of extension of the cover element. Preferably, the cover element is covered, in particular at least in one operating state, by the hammer tube and/or the hammer tube guide element, in particular at least as viewed along a transverse axis of the cover element. The transverse axis of the cover element preferably runs perpendicularly to the main axis of extension of the cover element. Advantageously, a space-saving gap seal of a particularly cost-effective and light hammer tube—in particular, a hammer tube that is seamlessly longitudinally slotted—can be made possible. A cover element for the gap seal can advantageously be arranged in a particularly easy-to-assemble manner.

Furthermore, it is proposed that the striking mechanism device, in particular in at least one embodiment, has at least one cover element—in particular, the previously mentioned cover element—which, in particular at least in one operating state, contacts an outer surface—in particular, the previously mentioned outer surface—of the hammer tube, and a hammer tube guide element—in particular, the previously mentioned hammer tube guide element—in which the hammer tube can be arranged, wherein the hammer tube guide element has at least one elongate elevation which forms the cover. The elongate elevation preferably extends over the entire longitudinal extension of the hammer tube guide element. The elongate elevation preferably has a curvature, in particular at least as viewed along the circumferential direction of the hammer tube guide element, which corresponds to a curvature of the hammer tube, preferably the outer surface of the hammer tube, in particular at least as viewed along the circumferential direction of the hammer tube, preferably at least in a region of the longitudinal slot. The elongate elevation is preferably arranged between two bearing ribs of the bearing ribs, in particular at least as viewed along the circumferential direction of the hammer tube guide element. The elongate elevation preferably forms a gap seal, in particular in addition to or as an alternative to the cover element. By using the hammer tube guide element to seal the seamlessly longitudinally slotted hammer tube, particularly low production costs can be achieved for a striking mechanism device. Advantageously, a desired sealing of the hammer tube in the region of the longitudinal slot can be achieved, at least in one operating state, by already existing components of the striking mechanism device. A particularly robust gap seal can advantageously be provided.

It is also proposed that the striking mechanism device, in particular in at least one embodiment, has at least one cover element—in particular, the previously mentioned cover element—which contacts an outer surface of the hammer tube—in particular, the previously mentioned outer surface—with the cover element being formed by an element which is glued to the hammer tube element. The cover element is designed, for example, as an adhesive strip, adhesive tape, or the like. It is also conceivable that the cover element is designed as a strip-like component which is in particular at least partially, preferably completely, made of metal or plastics material and is preferably attached to the outer surface of the hammer tube by means of an adhesive. The cover element preferably has a curvature, at least along the circumferential direction of the cover element, which corresponds to the curvature of the hammer tube, preferably the outer surface of the hammer tube, in particular at least as viewed along the circumferential direction of the hammer tube, preferably at least in a region of the longitudinal slot. A sealing of a hammer tube that is produced cost-effectively and is light and seamlessly longitudinally slotted can advantageously be achieved, in particular even if the hammer tube is not arranged in the hammer tube guide element. Advantageously, a cover element that can be easily replaced and/or repaired can be provided. The cover element can advantageously be checked for damage and/or leaks in a particularly simple manner.

Furthermore, it is proposed that the striking mechanism device, in particular in at least one embodiment, has at least one cover element—in particular, the previously mentioned cover element—which contacts an outer surface of the hammer tube—in particular, the previously mentioned outer surface—with the cover element being formed by a rubber and/or foam element. It is conceivable that the rubber and/or foam element is designed as a pre-compressed foam sealing strip, as a rubber sealing strip, or the like. The rubber and/or foam element is preferably arranged, in particular clamped, between the hammer tube and the hammer tube guide element, in particular at least in one operating state. At least one rubber and/or foam element designed as a pre-compressed foam sealing strip is preferably provided to expand slowly over time in order to particularly preferably produce the gap seal. In at least one embodiment, a rubber and/or foam element designed as a rubber sealing strip is preferably arranged in a longitudinal groove of the hammer tube guide element, in particular in at least one operating state, and the rubber and/or foam element, at least in a state in which the hammer tube is not arranged in the hammer tube guide element, protrudes past the longitudinal groove, preferably at least as viewed along a radial axis of the hammer tube guide element. The rubber and/or foam element designed as a rubber sealing strip can preferably be compressed by the arrangement of the hammer tube in the hammer tube guide element, in order in particular to produce the gap seal. The longitudinal groove preferably extends at least over the entire longitudinal extension of the hammer tube guide element. A main axis of extension of the longitudinal groove preferably runs in parallel with the main axis of extension of the hammer tube guide element. Advantageously, a desired gap seal of a cost-effectively produced and lightweight, seamlessly slotted hammer tube can be achieved, wherein a sealing cover element can be replaced, checked for damage, and/or cleaned particularly easily and in particular in a non-destructive manner.

In addition, it is proposed that the striking mechanism device, in particular in at least one embodiment, has at least one cover element—in particular, the previously mentioned cover element—which contacts an outer surface of the hammer tube—in particular, the previously mentioned outer surface—wherein the cover element is designed as a tubular element with at least one ventilation opening arranged in a peripheral surface of the cover element, the ventilation opening being intended to align, in at least one operating state, with at least one ventilation opening formed in a peripheral surface of the hammer tube. It is conceivable that the peripheral surface of the hammer tube and/or the peripheral surface of the cover element has a plurality of ventilation openings. The hammer tube is preferably, at least in one operating state, at least substantially completely enclosed by the cover element, in particular at least as viewed radially. In particular, the hammer tube is arranged coaxially to the cover element at least in one operating state. The maximum outside diameter of the hammer tube preferably corresponds to a maximum inside diameter of the cover element. The maximum outside diameter of the cover element preferably corresponds to the maximum inside diameter of the hammer tube guide element. The maximum inside diameter of the hammer tube guide element is particularly preferably smaller than the maximum outside diameter of the cover element. The cover element is designed identically to the hammer tube, for example, in particular excluding the maximum inside and/or outside diameter and/or excluding the dimensions and/or a number of ventilation openings thereof. In particular, at least one positioning element is formed on the cover element for axial positioning and/or for positioning in a circumferential direction of the cover element which runs in a plane perpendicular to the main axis of extension of the cover element relative to the hammer tube. A plurality of positioning elements is preferably formed on the cover element, and these are distributed along the circumferential direction of the cover element. The positioning element of the cover element is preferably—and the plurality of positioning elements of the cover element is particularly preferably—formed on an axial end of the cover element. A further axial end of the cover element, which is in particular arranged remote from the axial end of the cover element, is preferably formed without positioning elements. The positioning element of the cover element is preferably designed as an outwardly directed tab. It is also conceivable for the positioning element of the cover element to be in the form of a different positioning element that appears sensible to a person skilled in the art. In particular, the positioning element of the cover element is provided to interact with a positioning element of the hammer tube for axial positioning and/or for positioning the cover element relative to the hammer tube. Advantageously, a desired gap seal of a cost-effectively produced and lightweight, seamlessly slotted hammer tube can be achieved, wherein a sealing cover element can be replaced, checked for damage, and/or cleaned particularly easily and in particular in a non-destructive manner. Proper assembly of the cover element on the hammer tube can advantageously be facilitated.

In addition, it is proposed that the striking mechanism device comprises at least one hammer tube guide element—in particular, the previously mentioned hammer tube guide element—wherein at least one positioning element—in particular, the previously mentioned positioning element—is formed on the hammer tube, which is used for axial positioning and/or for positioning in a circumferential direction—in particular, in the previously mentioned circumferential direction—of the hammer tube relative to the hammer tube guide element, wherein the positioning element is designed in particular as an outwardly directed tab. Preferably, at least a plurality of positioning elements are preferably formed on the hammer tube, and are preferably distributed along the circumferential direction of the hammer tube. The positioning element, in particular the plurality of positioning elements, is/are preferably formed on the hammer tube on an axial end of the hammer tube. A further axial end of the hammer tube, which is in particular arranged remote from the axial end of the hammer tube, is particularly preferably free of positioning elements. The positioning element is intended to interact with at least one positioning element of the hammer tube guide element for the purpose of axially positioning the hammer tube and/or for positioning in the circumferential direction of the hammer tube relative to the hammer tube guide element. At least one positioning element, preferably a plurality of positioning elements, is preferably formed on the hammer tube guide element. The positioning elements of the hammer tube guide element are preferably formed on an axial end of the hammer tube guide element. A further axial end of the hammer tube guide element, which is arranged in particular remote from the axial end of the hammer tube guide element, is preferably free of positioning elements. The positioning element of the hammer tube guide element is preferably formed on one of the bearing ribs, in particular on an axial end of this one bearing rib of the bearing ribs. The positioning element is preferably designed as a recess, latching notch, latching lug, or the like, to which the positioning element of the hammer tube preferably forms the counterpart. Preferably, a movement of the hammer tube along the circumferential direction of the hammer tube relative to the hammer tube guide element and/or an axial movement of the hammer tube relative to the hammer tube guide element is blocked in at least one direction by the interaction of the positioning element of the hammer tube with the positioning element of the hammer tube guide element. Advantageously, the cost-effectively manufactured, particularly light, seamlessly longitudinally slotted hammer tube can be mounted with a precise fit on the hammer tube guide element in a particularly comfortable manner. Improper positioning of the hammer tube relative to the hammer tube guide element can advantageously be counteracted.

Furthermore, it is proposed that the striking mechanism device has at least one clamping element and a hammer tube guide element—in particular, the previously mentioned hammer tube guide element—the clamping element being provided for axially clamping the hammer tube with the hammer tube guide element. The clamping element is designed, for example, as an elastic element, in particular as a piece of rubber, preferably as an O-ring. The clamping element is intended to rest on the positioning element, in particular on the multiple positioning elements, of the hammer tube at least in one operating state. The hammer tube is preferably clamped axially to the hammer tube guide element by the clamping element by means of a fastening, in particular a screw connection, of the hammer tube guide element to the gear housing of the striking mechanism device and/or hand-held power tool or to a flange of the striking mechanism device. The clamping element is arranged in particular between the gear housing of the striking mechanism device and/or the hand-held power tool or the flange and the hammer tube guide element. A particularly rigid and precise fit of the cover element and/or the hammer tube can advantageously be ensured. An undesired disassembly of the hammer tube can advantageously be counteracted.

The disclosure also relates to a method for producing a hammer tube—in particular, the previously mentioned hammer tube—of a striking mechanism device according to the disclosure. It is proposed that, in at least one method step, a longitudinal slot—in particular, the previously mentioned longitudinal slot—of the hammer tube is produced in the hammer tube over at least substantially the entire longitudinal extension of the hammer tube—in particular, over the previously mentioned longitudinal extension. The longitudinal slot is preferably produced in a bending process. It is also conceivable that the longitudinal slot is introduced into a solid tube during an extrusion process or after an extrusion process. A hammer tube can advantageously be produced at low cost, and in particular can be arranged with a particularly precise fit on a hammer tube guide element.

Furthermore, it is proposed that the longitudinal slot is produced by bending a plate-shaped metal sheet. In at least one method step, the plate-shaped metal sheet is preferably bent into a tubular shape, such that at least two free longitudinal edges of the metal sheet preferably lie opposite each other. The two opposite free longitudinal edges of the metal sheet preferably form the two free longitudinal edges of the hammer tube. A particularly light hammer tube can advantageously be produced particularly cost-effectively.

In addition, a hand-held power tool is proposed—in particular, the previously mentioned power tool—in particular a hammer drill and/or chisel hammer, having at least one striking mechanism device according to the disclosure. The hand-held power tool can be designed, for example, as a hammer drill, a chisel hammer, a demolition hammer, or a rotary percussion drill, or another hand-held power tool that a person skilled in the art deems appropriate. The hand-held power tool is preferably designed as a portable, in particular plug-in or battery-operated, hand-held power tool. It is also conceivable that the hand-held power tool is designed as a pneumatic hand-held power tool. The configuration according to the disclosure advantageously makes it possible to provide a hand-held power tool with a particularly cost-effective and lightweight striking mechanism device.

The striking mechanism device according to the disclosure, the method according to the disclosure, and/or the hand-held power tool according to the disclosure should not be limited to the application and embodiment described above. In particular, the striking mechanism device according to the disclosure, the method according to the disclosure and/or the hand-held power tool according to the disclosure can have a number of individual elements, components and units as well as method steps that differs from the number specified here in order to fulfill a function described herein. In addition, in the case of the value ranges specified in this disclosure, values within the mentioned limits are also to be considered as disclosed and usable as desired.

BRIEF DESCRIPTION OF THE DRAWINGS

Further advantages result from the following description of the drawings. Six embodiments of the disclosure are shown in the drawings. The drawings, the description and the claims contain numerous features in combination. A person skilled in the art will expediently also consider the features individually and combine them to form meaningful further combinations. In the drawings:

DETAILED DESCRIPTION

Figure 1:
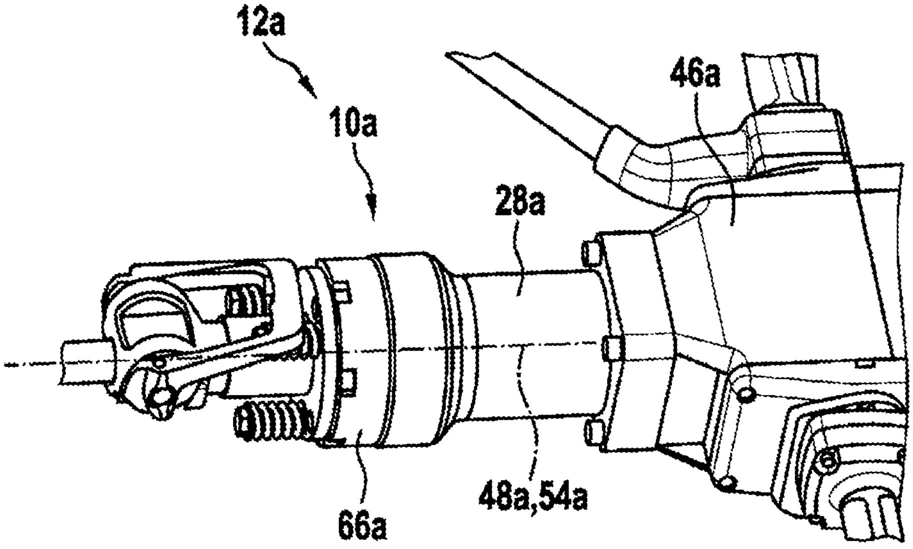
FIG. 1 shows a hand-held power tool according to the disclosure, having a striking mechanism device according to the disclosure.

FIG. 1 shows part of a hand-held power tool 12*a*. The hand-held power tool 12*a* is designed as a chisel hammer, in particular as a demolition hammer. However, it is also conceivable for the hand-held power tool 12*a* to be in the form of a hammer drill, a rotary percussion hammer, or another hand-held power tool considered appropriate by a person skilled in the art. The hand-held power tool 12*a* is embodied as a portable hand-held power tool 12*a*, in particular a plug-in or battery-operated hand-held power tool. It is also conceivable that the hand-held power tool 12*a* is designed as a pneumatic hand-held power tool. The hand-held power tool 12*a* comprises at least one striking mechanism device 10*a*.

Figure 2:
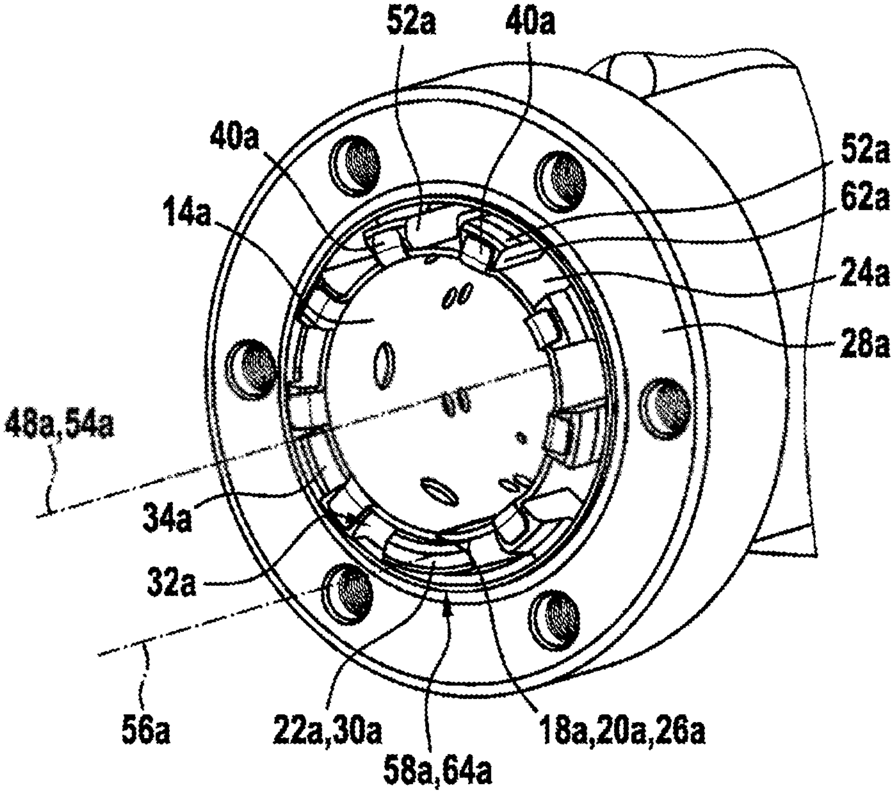
FIG. 2 shows a hammer tube of the striking mechanism device according to the disclosure in a state arranged on a hammer tube guide element of the striking mechanism device according to the disclosure.

The striking mechanism device 10*a* is designed as a pneumatic striking mechanism, in particular as a wobble striking mechanism or as an eccentric striking mechanism. The striking mechanism device 10*a* preferably comprises at least one striker 16*a*. The striking mechanism device 10*a* preferably comprises a drive piston (not shown here), which is configured to drive the striker 16*a*. The pneumatic striking mechanism device 10*a* comprises at least one hammer tube 14*a* (cf. FIGS. 2 to 4) which is provided for guiding the striker 16*a* and/or the drive piston. A compression chamber of the striking mechanism device, in which an air cushion can be compressed during operation of the striking mechanism device designed as a pneumatic striking mechanism, is preferably arranged between the striker 16*a* and the drive piston. The drive piston can be driven, for example, via a wobble drive of the striking mechanism device 10*a* designed as a wobble striking mechanism, or via an eccentric drive of the striking mechanism device 10*a* designed as an eccentric striking mechanism. The drive piston and the striker 16*a* preferably have substantially the same maximum outer diameter. The hammer tube 14*a* is formed from sheet metal. The hammer tube 14*a* is designed to be seamlessly longitudinally slotted over at least a substantially entire longitudinal extension of the hammer tube 14*a*. The hammer tube 14*a* is formed of a single component that is entirely tubular in shape. The hammer tube 14*a* has a circular cross section over the entire longitudinal extension of the hammer tube 14*a*. The longitudinal extension, in particular the entire longitudinal extension, runs in parallel with a main axis of extension 48*a* of the hammer tube 14*a*.

The striking mechanism device 10*a* comprises at least one hammer tube guide element 28*a*, in which the hammer tube 14*a* can be arranged. At least in one operating state, the hammer tube 14*a* is arranged in the hammer tube guide element 28*a* (cf. FIG. 1 to 3). The hammer tube guide element 28*a* is tubular. The hammer tube guide element 28*a* has at least one circular internal cross section. A plurality of bearing ribs 52*a* is formed on an inner side 34*a* of the hammer tube guide element 28*a*, on which the hammer tube 14*a* rests in at least one operating state. The respective main axes of extension of the bearing ribs 52*a* run in parallel with a main axis of extension 54*a* of the hammer tube guide element 28*a*. The bearing ribs 52*a* extend over the entire longitudinal extension of the hammer tube guide element 28*a*. The longitudinal extension, in particular the entire longitudinal extension, of the hammer tube guide element 28*a* runs in parallel with the main axis of extension 54*a* of the hammer tube guide element 28*a*. The bearing ribs 52*a* are preferably distributed along a circumferential direction of the hammer tube guide element 28*a* which runs in a plane perpendicular to the main axis of extension 54 of the hammer tube guide element 28*a*. The bearing ribs 52*a* are designed to be interrupted in portions, at least as viewed along the respective main axes of extension of the bearing ribs 52*a*. However, it is also conceivable that the bearing ribs 52*a*, at least as viewed along the respective main axes of extension of the bearing ribs 52*a*, are designed without interruption. A maximum longitudinal extension of the hammer tube guide element 28*a* preferably corresponds to the maximum longitudinal extension of the hammer tube 14*a*. In at least one operating state, the hammer tube 14*a* is at least substantially completely surrounded by the hammer tube guide element 28*a*, as viewed at least radially. The hammer tube guide element 28*a* can be formed, for example, at least partially, preferably completely, from a light metal, in particular aluminum or the like, or from a plastics material. The hammer tube guide element 28*a* is fastened to a transmission housing 46*a* of the hand-held power tool 12*a*. It is also conceivable that the hammer tube guide element 28*a* is formed as a single piece together with the gear housing 46*a* of the hand-held power tool 12*a*.

The hammer tube 14*a* has a longitudinal slot 26*a*. The longitudinal slot 26*a* is formed in a lateral surface 50*a* of the hammer tube 14*a*. The longitudinal slot 26*a* extends in parallel with the main axis of extension 48*a* of the hammer tube 14*a*. However, it is also conceivable that the longitudinal slot 26*a* extends transversely, in particular at an angle of in particular less than 90°, preferably less than 45° and very particularly preferably less than 15°, to the main axis of extension 48*a* of the hammer tube 14*a*. The hammer tube 14*a* is rotationally symmetrical to the main axis of extension 48*a* of the hammer tube 14*a*. The hammer tube 14*a* has two free longitudinal edges 18*a*, 20*a*. The two free longitudinal edges 18*a*, 20*a* delimit the longitudinal slot 26*a*. The two free longitudinal edges 18*a*, 20*a* lie opposite each other, at least when viewed along a circumferential direction of the hammer tube 14*a* which extends in a plane perpendicular to the main axis of extension 48*a* of the hammer tube 14*a*. The two free longitudinal edges 18*a*, 20*a* are designed without teeth and/or have a straight profile along a portion that corresponds to at least 25% of a maximum longitudinal extension of the hammer tube 14*a*. The two free longitudinal edges 18*a*, 20*a* run in parallel with the main axis of extension 48*a* of the hammer tube 14*a*. However, it is also conceivable that the two free longitudinal edges 18*a*, 20*a* run transversely, in particular at an angle of in particular less than 90°, preferably less than 45° and very particularly preferably less than 15°, to the main axis of extension 48*a* of the hammer tube 14*a*. The longitudinal slot 26*a* is free of a weld seam, an adhesive seam, or the like, in particular over the entire longitudinal extension of the hammer tube 14*a*. A region between the two free longitudinal edges 18*a*, 20*a*, at least as viewed along the circumferential direction of the hammer tube 14*a*, is free of an adhesive seam, a welded seam, or the like, in particular over the entire longitudinal extension of the hammer tube 14*a*.

The two free longitudinal edges 18*a*, 20*a* contact each other without a material bond, at least in one operating state. The two free longitudinal edges 18*a*, 20*a* are at least in contact with each other when the hammer tube 14*a* is arranged in the hammer tube guide element 28*a*. The two free longitudinal edges 18*a*, 20*a* contact each other without a material bond over the entire longitudinal extension of the hammer tube 14*a*. A maximum outside diameter of the hammer tube 14*a* corresponds to a maximum inside diameter of the hammer tube guide element 28*a*. The maximum inside diameter of the hammer tube guide element 28*a* is particularly preferably smaller than the maximum outside diameter of the hammer tube 14*a*. Dimensions of the hammer tube 14*a* and/or the hammer tube guide element 28*a*, in particular the maximum inside diameter of the hammer tube guide element 28 and/or the maximum outside diameter of the hammer tube 14*a*, are selected in such a way that an arrangement of the hammer tube 14*a* in the hammer tube guide element 28*a* prevents out-of-roundness in the hammer tube 14*a* and a distance between the two free longitudinal edges 18*a*, 20*a* or the like can be corrected. The maximum inside diameter of the hammer tube guide element 28*a* is specified by the bearing ribs 52*a* of the hammer tube guide element 28*a*. By inserting the hammer tube 14*a* into the hammer tube guide element 28*a*, a movement of the two free longitudinal edges 18*a*, 20*a* can be produced, in particular until the two free longitudinal edges 18*a*, 20*a* contact each other.

Alternatively or additionally, it is conceivable that a cavity or a spacing is formed between the two free longitudinal edges 18*a*, 20*a*. A gap is formed between the two free longitudinal edges 18*a*, 20*a*. The two free longitudinal edges 18*a*, 20 are spaced apart from each other, viewed along the circumferential direction of the hammer tube 14*a*, in particular in such a way that end faces of the two free longitudinal edges 18*a*, 20*a* are not in contact. The cavity or the spacing is or can be formed between the two free longitudinal edges 18*a*, 20*a*, at least when the hammer tube 14*a* is not arranged in the hammer tube guide element 28*a*. It is also conceivable that a cavity or a spacing is formed between the two free longitudinal edges 18*a*, 20*a* when the hammer tube 14*a* is arranged in the hammer tube guide element 28*a*, in particular depending on a permissible tolerance range for a minimum inside diameter of the hammer tube 14*a* for guiding the striker 16*a*. The cavity or the spacing preferably extends along the entire longitudinal extension of the hammer tube. The two free longitudinal edges, viewed in the circumferential direction, preferably have a maximum spacing of in particular less than 1 mm, preferably less than 0.5 mm, particularly preferably less than 0.1 mm, and very particularly preferably less than 0.01 mm. The cavity or the spacing is in particular at least free of a weld seam, an adhesive seam, or the like.

Figure 3:
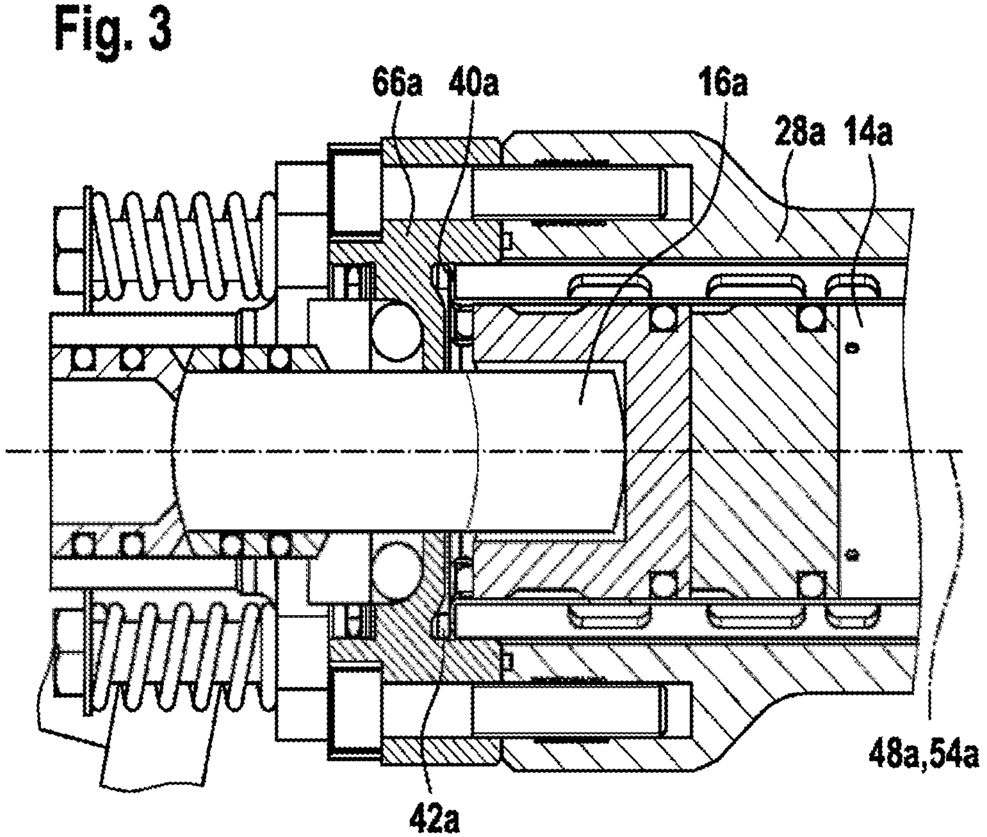
FIG. 3 shows a partial detail of the striking mechanism device according to the disclosure in a sectional view.
Figure 4:
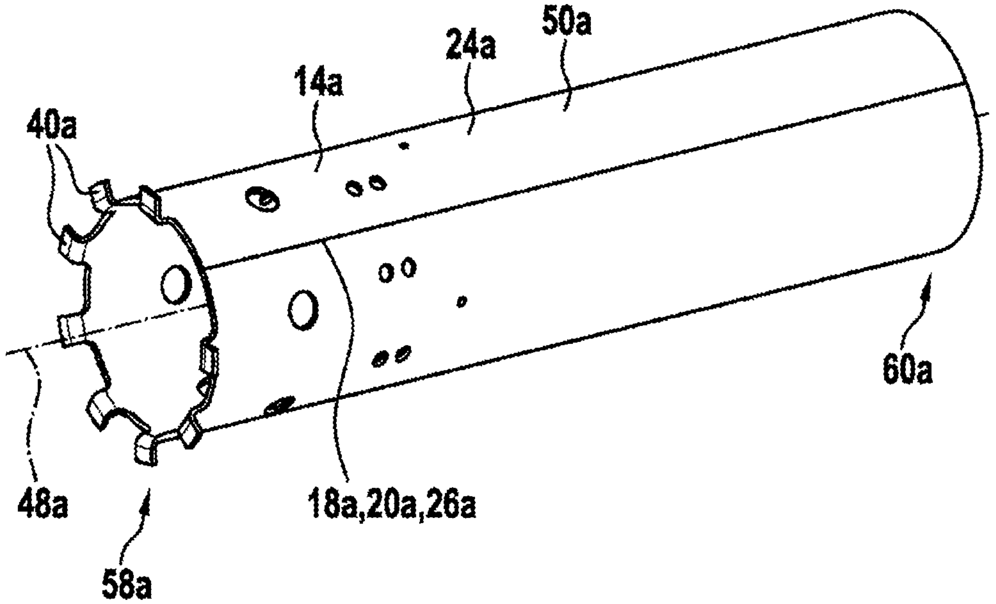
FIG. 4 shows the hammer tube of the striking mechanism device according to the disclosure.

The striking mechanism device 10*a* has at least one cover element 22*a* which, in particular in at least one operating state, contacts an outer surface 24*a* of the hammer tube 14*a* and overlaps the longitudinal slot 26*a* of the hammer tube 14*a* in such a way that a gap seal can be produced between the longitudinal slot 26*a* and the cover element 22*a* (cf. FIG. 3). The cover element 22 preferably overlaps the longitudinal slot 26*a* at least as viewed along the circumferential direction of the hammer tube 14*a*. The cover element 22*a* overlaps the longitudinal slot 26*a* over an entire longitudinal extension of the longitudinal slot 26*a*. The cover element 22*a* has at least one main axis of extension 56*a*, which runs in parallel with the main axis of extension 48*a* of the hammer tube 14*a* and/or with the main axis of extension 54*a* of the hammer tube guide element 28*a* at least in one operating state. The cover element 22*a* overlaps the longitudinal slot 26*a* when the hammer tube 14*a* is arranged in the hammer tube guide element 28*a*, in particular in an operating position. The cover element 22*a* is arranged between two bearing ribs 52*a* of the bearing ribs 52*a*, at least as viewed along the circumferential direction of the hammer tube guide element 28*a*, at least when the hammer tube 14*a* is arranged in the hammer tube guide element 28*a*. Along the circumferential direction of the hammer tube guide element 28*a*, at least one recess 32*a* is formed on the inner side 34*a* of the hammer tube guide element 28*a*, in which recess the cover element 22*a* is arranged. The recess 32*a* is delimited by at least two bearing ribs 52*a* of the bearing ribs 52*a* which are directly adjacent along the circumferential direction of the hammer tube guide element 28*a*. The cover element 22*a* is provided to seal the longitudinal slot 26*a* in a fluid-tight manner, in particular in an air-tight manner. The region, in particular the cavity or the spacing between the two free longitudinal edges 18*a*, 20*a*, is at least substantially, preferably completely, free of the cover element 22*a*. The cover element 22*a* is designed differently from the hammer tube 14*a*.

Alternatively, it is conceivable in at least one exemplary embodiment for the cover element 22*a* to be formed by the hammer tube 14*a*, wherein, for example, at least one free longitudinal edge 18*a* of the two free longitudinal edges 18*a*, 20*a* of the hammer tube 14*a* is folded back in such a manner, in particular in a Z or S shape, in particular at least when viewed along the circumferential direction of the hammer tube 14*a*, that a gap seal can be produced.

The hammer tube guide element 28*a* has at least one elongate elevation 30*a* which forms the cover element 22*a*. The elongate elevation 30*a* extends over the entire longitudinal extension of the hammer tube guide element 28*a*. The elongate elevation 30*a* preferably has a curvature, in particular as viewed along the circumferential direction of the hammer tube guide element 28*a*, which corresponds to a curvature of the hammer tube 14*a*, preferably the outer surface 24*a* of the hammer tube 14*a*, in particular as viewed along the circumferential direction of the hammer tube 14*a*, at least in a region of the longitudinal slot 26*a*. The elongate elevation 30*a* is arranged between two bearing ribs 52*a* of the bearing ribs 52*a*, at least as viewed along the circumferential direction of the hammer tube guide element 28*a*.

A plurality of positioning elements 40*a* is formed on the hammer tube 14*a*, which positioning elements are provided for axial positioning and/or for positioning in a circumferential direction of the hammer tube 14*a* relative to the hammer tube guide element 28*a*. It is also conceivable that only at least one positioning element 40*a* is formed on the hammer tube 14*a*. The positioning elements 40*a* are designed as outwardly directed tabs. The positioning elements 40*a* are distributed along the circumferential direction of the hammer tube 14*a*. The positioning elements 40*a* are formed on an axial end 58*a* of the hammer tube 14*a*. A further axial end 60*a* of the hammer tube 14*a*, which is arranged remote from the axial end 58*a* of the hammer tube 14*a*, is free of positioning elements. The positioning elements 40*a* are intended to interact with at least one positioning element 62*a* of the hammer tube guide element 28*a* for the purpose of axial positioning of the hammer tube 14*a* and/or for positioning in the circumferential direction of the hammer tube 14*a* relative to the hammer tube guide element 28*a*. A plurality of positioning elements 62*a* is formed on the hammer tube guide element 28*a*. The positioning elements 62*a* of the hammer tube guide element 28*a* are formed on an axial end 64*a* of the hammer tube guide element 28*a*. A further axial end of the hammer tube guide element 28*a*, which is arranged remote from the axial end 64*a* of the hammer tube guide element 28*a*, is free of positioning elements. The positioning elements 62*a* of the hammer tube guide element 28*a* are formed on the bearing ribs 52*a*, in particular on axial ends of the bearing ribs 52*a*. The positioning elements 62*a* of the hammer tube guide element 28*a* are designed as latching notches to which the positioning elements 40*a* of the hammer tube 14*a* form the counterpart. A movement of the hammer tube 14*a* along the circumferential direction of the hammer tube 14*a* relative to the hammer tube guide element 28*a* and/or an axial movement of the hammer tube 14*a* relative to the hammer tube guide element 28*a* is blocked in at least one direction by the interaction of the positioning elements 40*a* of the hammer tube 14*a* with the positioning elements 62*a* of the hammer tube guide element 28*a*.

The striking mechanism device 10*a* has at least one clamping element 42*a*, which is provided for axially clamping the hammer tube 14*a* with the hammer tube guide element 28*a*. The clamping element is designed, for example, as an elastic element, in particular as a piece of rubber, preferably as an O-ring. The clamping element 42*a* is intended to rest on the plurality of positioning elements 40*a* of the hammer tube 14*a* at least in one operating state. The hammer tube 14*a* is clamped axially to the hammer tube guide element 28*a* by the clamping element 42*a* by means of a fastening, in particular a screw connection, of the hammer tube guide element 28*a* to a flange 66*a* of the hand-held power tool 12*a*. The clamping element 42*a* is arranged between the flange 66*a* and the hammer tube guide element 28*a*.

Figure 5:
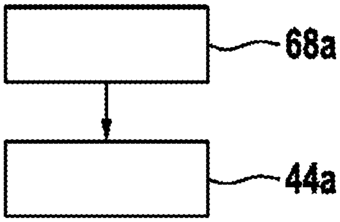
FIG. 5 shows a schematic sequence of a method according to the disclosure for producing the hammer tube of the striking mechanism device according to the disclosure.

FIG. 5 shows a schematic sequence of a method for producing the hammer tube 14*a* of the striking mechanism device 10*a*. In at least one method step 68*a*, a plate-shaped metal sheet is present. In at least one method step 44*a*, the plate-shaped metal sheet is bent into a tubular shape, in particular to form the hammer tube 14*a*. In the at least one method step 44*a*, the longitudinal slot 26*a* of the hammer tube 14*a* is produced in the hammer tube 14*a* over at least substantially the entire longitudinal extension of the hammer tube 14*a*. The longitudinal slot 26*a* is produced by bending the plate-shaped metal sheet.

Further embodiments of the disclosure are shown in FIGS. 6 to 10. The following descriptions and the drawings are substantially limited to the differences between the exemplary embodiments, wherein reference can in principle also be made to the drawings and/or the description of the other exemplary embodiments, in particular of FIGS. 1 to 5, with respect to identically designated components, in particular with respect to components having the same reference signs. To distinguish between the embodiments, the letter a follows the reference signs of the embodiment in FIGS. 1 to 6. In the embodiments of FIGS. 6 to 10, the letter a has been replaced by the letters b to f.

Figure 6:
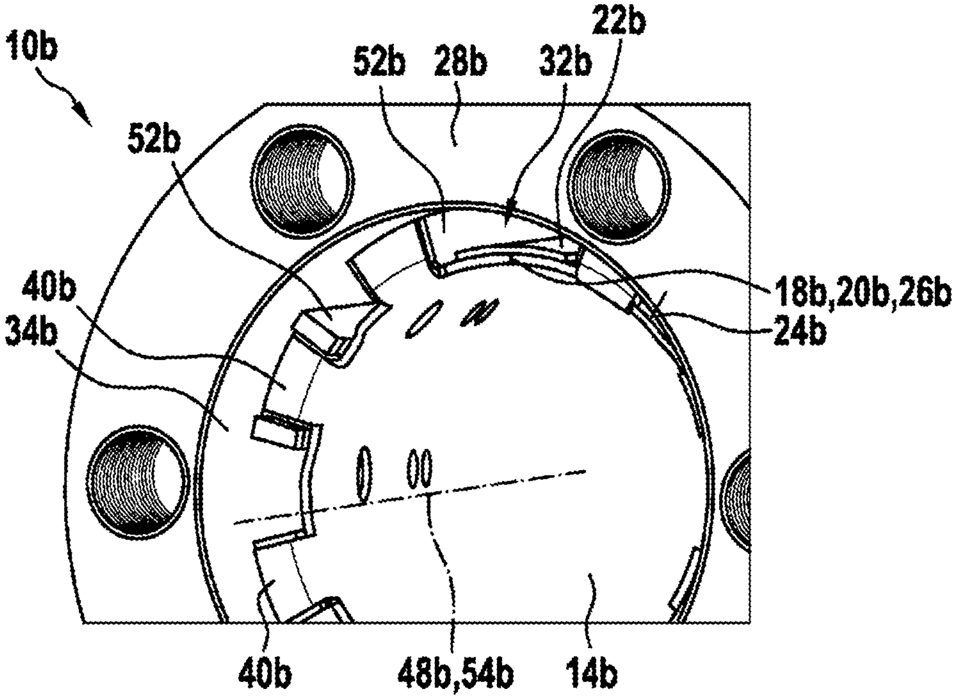
FIG. 6 shows a striking mechanism device according to the disclosure in a first alternative embodiment.

FIG. 6 shows a striking mechanism device 10*b* for a hand-held power tool (not shown here), having at least one hammer tube 14*b*, the hammer tube 14*b* being provided for guiding a striker (not shown here). The hammer tube 14*b* is formed from a metal sheet. The hammer tube 14*b* is designed to be seamlessly longitudinally slotted over at least substantially the entire longitudinal extension of the hammer tube 14*a*. The striking mechanism device 10*b* has at least one cover element 22*b* which contacts an outer surface 24*b* of the hammer tube 14*b*, with the cover element 22*b* being formed by an element which is glued to the hammer tube element 14*b*.

The cover element 22*b* overlaps a longitudinal slot 26*b* in the hammer tube 14*b* when the hammer tube 14*b* is arranged in a hammer tube guide element 28*b* of the striking mechanism device 10*b* and when the hammer tube 14*b* is separated from the hammer tube guide element 28*b*. A plurality of bearing ribs 52*b*, on which in particular the hammer tube 14*b* rests in at least one operating state, is preferably formed on an inner side 34*b* of the hammer tube guide element 28*b*. The cover element 22*b* is arranged between two bearing ribs 52*b* of the bearing ribs 52*b*, at least as viewed along a circumferential direction of the hammer tube guide element 28*b*. In at least one operating state, the cover element 22*b* is surrounded by the hammer tube guide element 28*b*, at least as viewed along a circumferential direction of the cover element 22*b* which runs in a plane perpendicular to a main axis of extension 48*b* of the cover element 22*b*. The cover element 22*b* is covered at least in one operating state by the hammer tube 14*b* and/or the hammer tube guide element 28*b*, at least as viewed along a transverse axis of the cover element 22*b*. The transverse axis of the cover element 22*b* runs perpendicularly to the main axis of extension axis 48*b* of the cover element 22*b*.

The cover element 22*b* is designed, for example, as an adhesive strip, adhesive tape, or the like. The cover element 22*b* has a curvature, at least along the circumferential direction of the cover element 22*b*, which corresponds to the curvature of the hammer tube 14*b*, preferably the outer surface 24*b* of the hammer tube 14*b*, in particular as viewed along the circumferential direction of the hammer tube 14*b*, preferably at least in a region of the longitudinal slot 26*b*.

Figure 7:
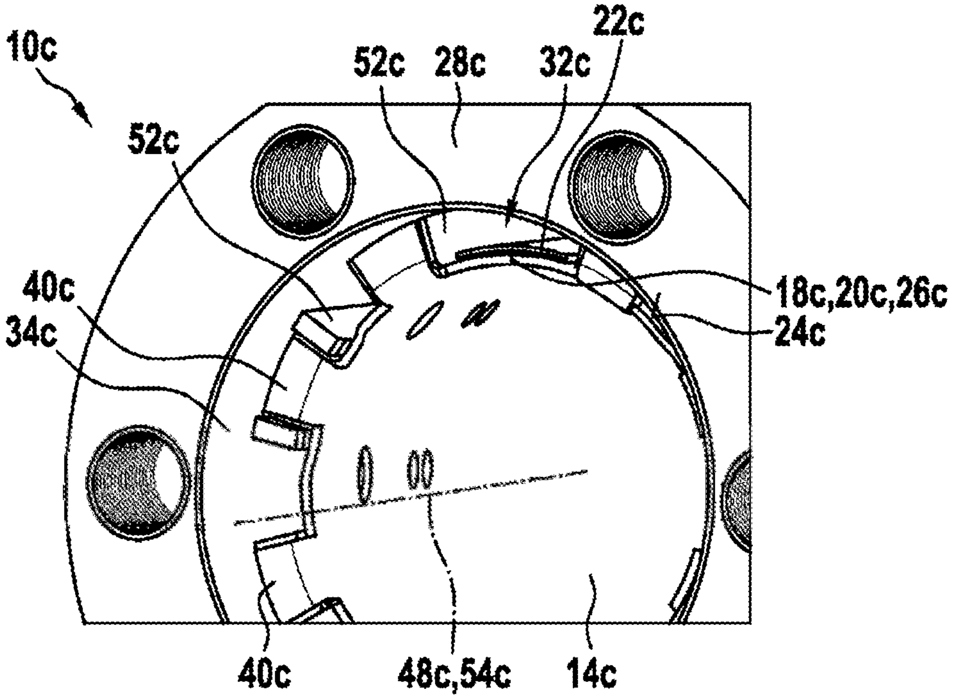
FIG. 7 shows a striking mechanism device according to the disclosure in a second alternative embodiment.

FIG. 7 shows a striking mechanism device 10*c* for a hand-held power tool (not shown here), having at least one hammer tube 14*c*, the hammer tube 14*c* being provided for guiding a striker (not shown here). The hammer tube 14*c* is formed from a metal sheet. The hammer tube 14*c* is designed to be seamlessly longitudinally slotted over at least substantially the entire longitudinal extension of the hammer tube 14*c*. The striking mechanism device 10*c* has at least one cover element 22*c* which contacts an outer surface 24*c* of the hammer tube 14*c*, with the cover element 22*c* being formed by an element which is glued to the hammer tube element 14*c*.

The cover element 22*c* overlaps a longitudinal slot 26*c* in the hammer tube 14*c* when the hammer tube 14*c* is arranged in a hammer tube guide element 28*c* of the striking mechanism device 10*c* and when the hammer tube 14*c* is separated from the hammer tube guide element 28*c*. A plurality of bearing ribs 52*c*, on which in particular the hammer tube 14*c* rests in at least one operating state, is preferably formed on an inner side 34*c* of the hammer tube guide element 28*c*. The cover element 22*c* is arranged between two bearing ribs 52*c* of the bearing ribs 52*c*, at least as viewed along a circumferential direction of the hammer tube guide element 28*c*. In at least one operating state, the cover element 22*c* is surrounded by the hammer tube guide element 28*c*, at least as viewed along a circumferential direction of the cover element 22*c* which runs in a plane perpendicular to a main axis of extension 48*c* of the cover element 22*c*. The cover element 22*c* is covered at least in one operating state by the hammer tube 14*c* and/or the hammer tube guide element 28*c*, at least as viewed along a transverse axis of the cover element 22*c*. The transverse axis of the cover element 22*c* runs perpendicularly to the main extension axis 48*c* of the cover element 22*c*. The cover element 22*c* is designed as a strip-like component which is at least partially, preferably completely, made of metal or plastics material and is attached to the outer surface 24*c* of the hammer tube 14*c* by means of an adhesive.

Figure 8:
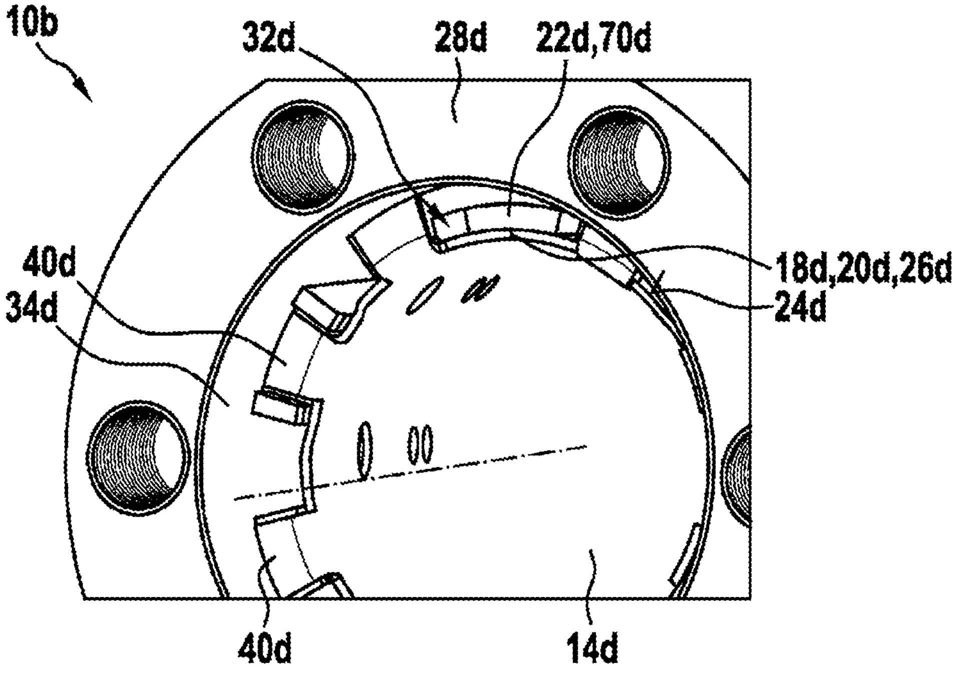
FIG. 8 shows a striking mechanism device according to the disclosure in a third alternative embodiment.

FIG. 8 shows a striking mechanism device 10*a* for a hand-held power tool (not shown here), having at least one hammer tube 14*d*, the hammer tube 14*d* being provided for guiding a striker (not shown here). The hammer tube 14*d* is formed from a metal sheet. The hammer tube 14*d* is designed to be seamlessly longitudinally slotted over at least substantially the entire longitudinal extension of the hammer tube 14*d*. The striking mechanism device 10*d* has at least one cover element 22*d* which contacts an outer surface 24*d* of the hammer tube 14*d*, with the cover element 22*d* being formed by a rubber and/or foam element 70*d*. The rubber and/or foam element 70*d* is designed as a pre-compressed foam sealing strip. The rubber and/or foam element 70*d* is preferably arranged, in particular clamped, between the hammer tube 14*d* and the hammer tube guide element 28*d* of the striking mechanism device 10*d*. The rubber and/or foam element 70*d* is provided to expand slowly over time in order to particularly preferably produce the gap seal.

Figure 9:
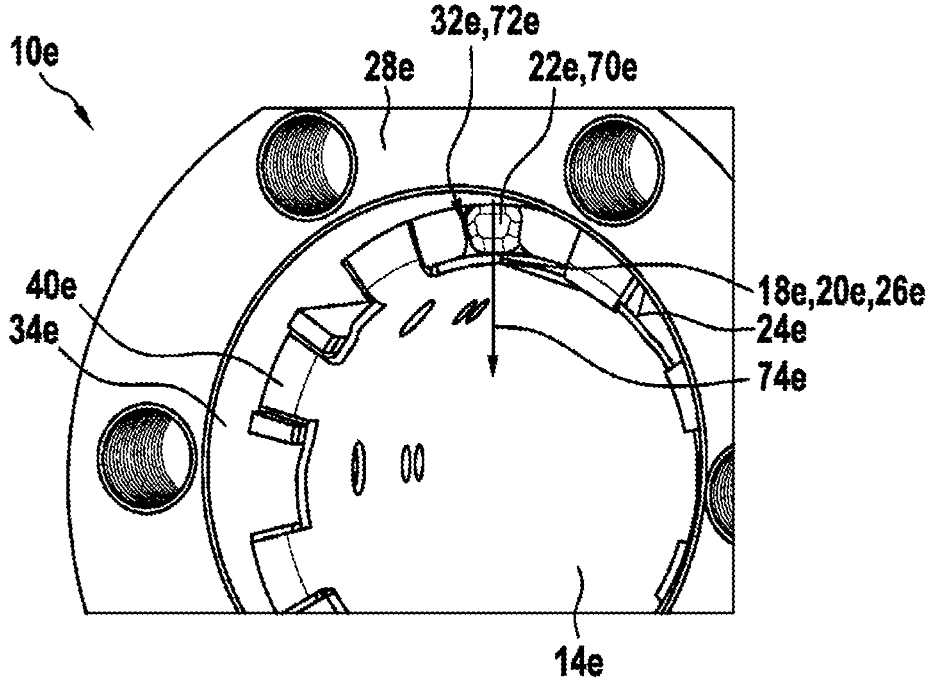
FIG. 9 shows a striking mechanism device according to the disclosure in a fourth alternative embodiment.

FIG. 9 shows a striking mechanism device 10*e* for a hand-held power tool (not shown here), having at least one hammer tube 14*e*, the hammer tube 14*e* being provided for guiding a striker (not shown here). The hammer tube 14*e* is formed from a metal sheet. The hammer tube 14*e* is designed to be seamlessly longitudinally slotted over at least substantially the entire longitudinal extension of the hammer tube 14*e*. The striking mechanism device 10*e* has at least one cover element 22*e* which contacts an outer surface 24*e* of the hammer tube 14*e*, with the cover element 22*e* being formed by a rubber and/or foam element 70*e*. The rubber and/or foam element 70*e* is designed as a rubber sealing strip. The rubber and/or foam element 70*e* is arranged in a longitudinal groove 72*e* of a hammer tube guide element 28*e* of the striking mechanism device 10*e* in at least one operating state, and the rubber and/or foam element 70*e*, at least in a state in which the hammer tube 14*e* is not arranged in the hammer tube guide element 28*e*, protrudes past the longitudinal groove 72*e*, at least as viewed along a radial direction 74*e* of the hammer tube guide element 28*e*. The rubber and/or foam element 70*e* designed as a rubber sealing strip can be compressed by the arrangement of the hammer tube 14*e* in the hammer tube guide element 28*e* in such a way that the gap seal can be produced. The longitudinal groove 72*e* preferably extends at least over the entire longitudinal extension of the hammer tube guide element 28*e*.

Figure 10:
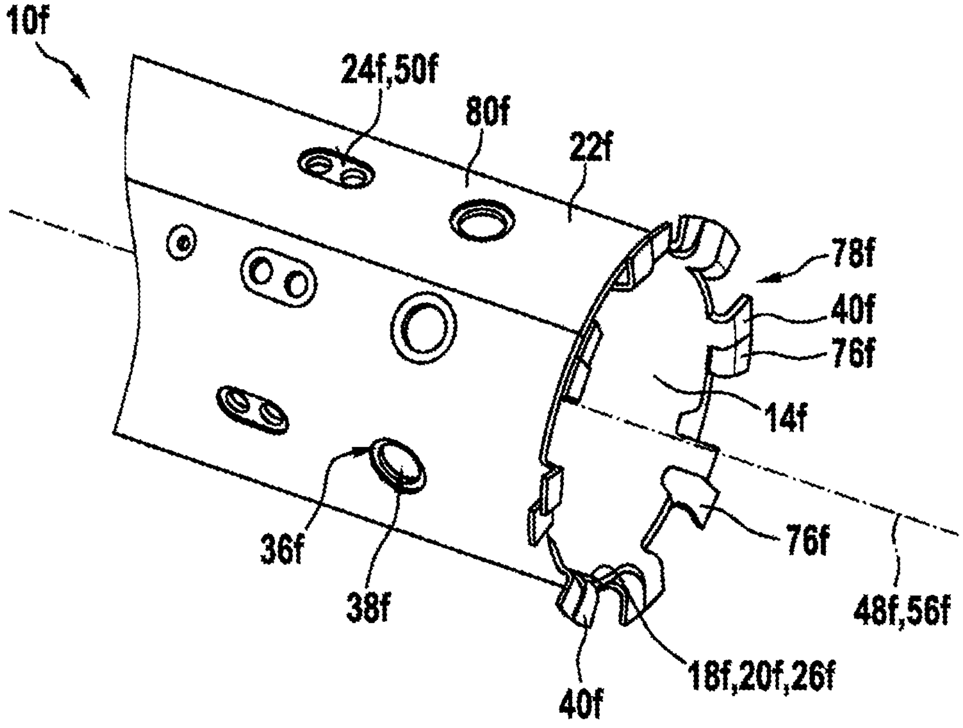
FIG. 10 shows a striking mechanism device according to the disclosure in a fifth alternative embodiment.

FIG. 10 shows a striking mechanism device 10*f* for a hand-held power tool (not shown here), having at least one hammer tube 14*f*, the hammer tube 14*f* being provided for guiding a striker (not shown here). The hammer tube 14*f* is formed from a metal sheet. The hammer tube 14*f* is designed to be seamlessly longitudinally slotted over at least substantially the entire longitudinal extension of the hammer tube 14*f*. The striking mechanism device 10*f* has at least one cover element 22*f* which contacts an outer surface 24*f* of the hammer tube 14*f*, wherein the cover element 22*f* is designed as a tubular element with at least one ventilation opening 36*f* arranged in a peripheral surface 80*a* of the cover element 22*f*, the ventilation opening 36*f* being intended to align, in at least one operating state, with at least one ventilation opening 38*f* formed in a peripheral surface 50*f* of the hammer tube 14*f*. The lateral surface 50*f* of the hammer tube 14*f* and the lateral surface 80*f* of the cover element 22*f* each have a plurality of ventilation openings 36*f*, 38*f*, which are in particular arranged in alignment with each other at least in one operating state.

At least in one operating state, the hammer tube 14*f* is at least substantially completely surrounded by the cover element 22*f*, in particular at least as viewed radially. In at least one operating state, the hammer tube 14*f* is arranged radially with respect to the cover element 22*f*. The maximum outside diameter of the hammer tube 14*f* corresponds to a maximum inside diameter of the cover element 22*f*. The maximum outside diameter of the cover element 22*f* corresponds to a maximum inside diameter of a hammer tube guide element (not shown here) 28*f* of the striking mechanism device 10*f*; the maximum inside diameter of the hammer tube guide element 28*f* is particularly preferably smaller than the maximum outside diameter of the cover element 22*f*. The cover element 22*f* is at least substantially identical to the hammer tube 14*f* except for a maximum inside and/or outside diameter and/or except for dimensions and/or a number of ventilation openings. Positioning elements 76*f* are formed on the cover element 22*f*, which positioning elements are provided for axial positioning and/or for positioning in a circumferential direction of the cover element 22*f*, which runs in a plane perpendicular to the main axis of extension 56*f* of the cover element 22*f*, relative to the hammer tube 14*f*. The positioning elements 76*f* are distributed along the circumferential direction of the cover element 22*f*. The plurality of positioning elements 76*f* are formed on an axial end 78*f* of the cover element 22*f*. A further axial end (not shown here) of the cover element 22*f* which is arranged remote from the axial end 78*f* of the cover element 22*f*, is designed without positioning elements. The positioning elements 76*f* of the cover element 22*f* are designed as outwardly directed tabs. It is also conceivable for the positioning elements 76*f* of the cover element 22*f* to be in the form of other positioning elements that appear sensible to a person skilled in the art. The positioning elements 76*f* of the cover element 22*f* are provided for interacting with positioning elements 40*f* of the hammer tube 14*f* for axial positioning and/or for positioning along the circumferential direction of the cover element 22*f* relative to the hammer tube 14*f*.

The invention claimed is:

1. A striking mechanism device for a hand-held power tool, comprising:
- at least one hammer tube configured to guide a striker and/or a drive piston;
- a cover element which is configured to contact, at least in one operating state, an outer surface of the at least one hammer tube; and
- a hammer tube guide element in which the at least one hammer tube is arranged,
- wherein the at least one hammer tube is designed to be seamlessly longitudinally slotted over at least substantially the entire longitudinal extension of the at least one hammer tube, and
- wherein the hammer tube guide element has at least one elongate elevation which forms the cover element.

2. The striking mechanism device according to claim 1, wherein the at least one hammer tube has two free longitudinal edges which are configured to contact each other without a material bond in at least one operating state.

3. The striking mechanism device according to claim 1, wherein:
- the at least one hammer tube has two free longitudinal edges, and
- a cavity or a space is formed between the two free longitudinal edges.

4. The striking mechanism device according to claim 1, further comprising:
- at least one cover element which is configured to contact, at least in one operating state, an outer surface of the at least one hammer tube and overlap a longitudinal slot of the at least one hammer tube in such a way that a gap seal is defined between the longitudinal slot and the cover element.

5. The striking mechanism device according to claim 1, further comprising:
- a cover element which is configured to contact, at least in one operating state, an outer surface of the at least one hammer tube, and
- a hammer tube guide element in which the at least one hammer tube is arranged,
- wherein at least one recess is formed on an inner side of the hammer tube guide element along a circumferential direction of the hammer tube guide element, and
- wherein the cover element is arranged in the at least one recess.

6. The striking mechanism device according to claim 1, further comprising:
- a hammer tube guide element in which the at least one hammer tube is arranged,
- at least one positioning element formed on the at least one hammer tube and configured for axial positioning and/or for positioning in a circumferential direction of the at least one hammer tube relative to the hammer tube guide element,
- wherein the positioning element is designed as an outwardly directed tab.

7. The striking mechanism device according to claim 1, further comprising:
- at least one clamping element; and
- a hammer tube guide element in which the at least one hammer tube is arranged,
- wherein the clamping element is configured to axially clamp the at least one hammer tube with the hammer tube guide element.

8. The striking mechanism device according to claim 1, wherein the at least one hammer tube is made of sheet metal.

9. A method for producing a hammer tube of a striking mechanism device according to claim 1, comprising:
- creating a longitudinal slot in the hammer tube over an at least substantially entire longitudinal extension of the hammer tube.

10. The method according to claim 9, wherein the creating step includes bending a plate-shaped metal sheet.

11. A pneumatic hand-held power tool having at least one striking mechanism device according to claim 1.

12. The pneumatic hand-held power tool according to claim 11, wherein the pneumatic hand-held power tool is a hammer drill and/or a chisel hammer.

* * * * *